March 17, 1964  A. J. DE MOUDE  3,125,347
RELATIVELY ROTATABLE FACE SEAL WITH FLEXIBLE BACKING MEMBER
Filed June 23, 1961
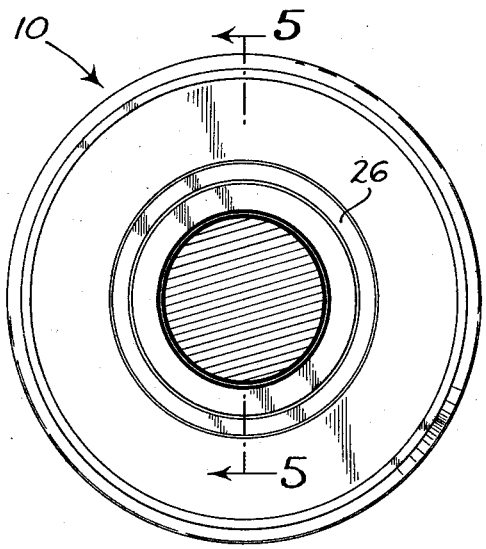
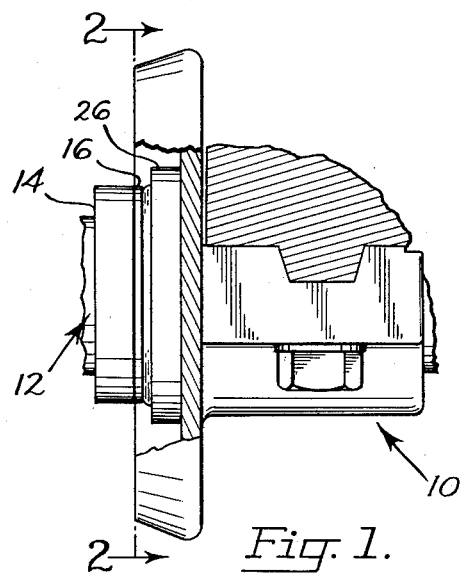
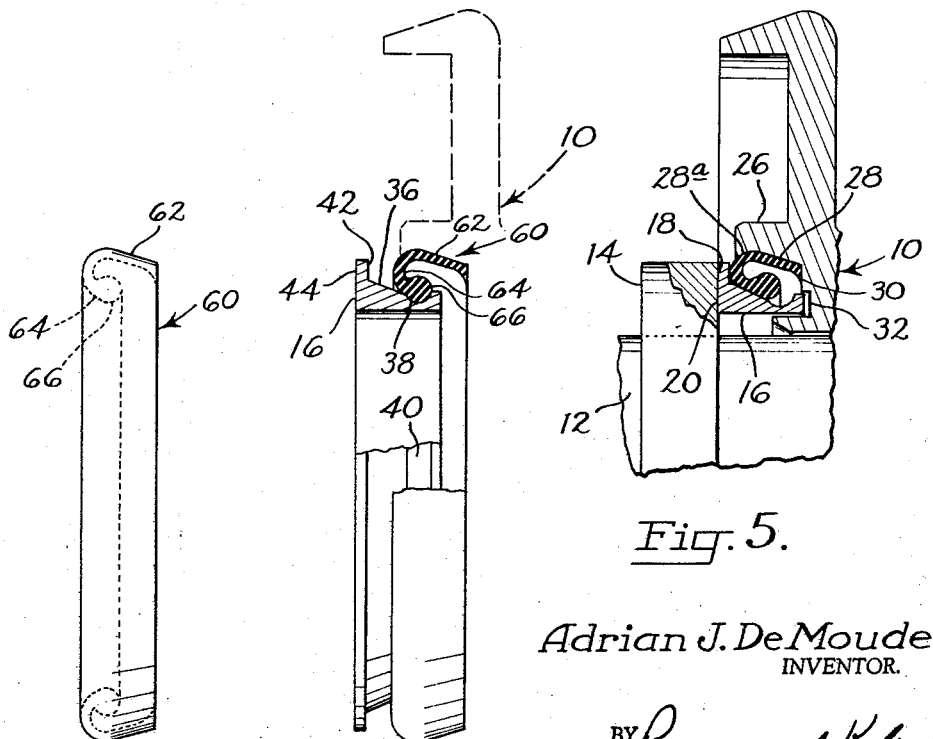
Adrian J. De Moude
INVENTOR.
BY Ramsey and Kolisch
Attys.

3,125,347
RELATIVELY ROTATABLE FACE SEAL WITH
FLEXIBLE BACKING MEMBER
Adrian J. De Moude, P.O. Box 392, Beaverton, Oreg.
Filed June 23, 1961, Ser. No. 119,226
8 Claims. (Cl. 277—92)

This invention relates to improvements in seals, and more particularly to an improved seal construction for sealing together two members that normally are subjected to some degree of play with respect to each other. The invention comprises the improved seal construction generally, and also the novel flexible sealing member present in the seal construction that produces the sealed relationship.

In a housing and shaft combination, where the shaft and housing are relatively rotatable, it is conventional to provide a running seal between the housing and shaft comprising a pair of annular members or rings having lapped surfaces that press against each other (and that because of this are sealed together), with means sealing one of the rings to the housing (with this ring and the housing being rotatable relative to the shaft) and the other of the rings to the rotatable shaft (with this ring and the shaft being rotatable relative to the housing). In a more specific sense, this invention relates to improvements in the way that the housing, for instance, is sealed to the ring associated therewith, where some play is accommodated between the ring and housing, but the parts are tightly sealed together at all times.

In such running seals, conventional constructions have been characterized by a number of disadvantages. These include tendencies for the sealing member repeatedly to stretch out excessively and then contract when the seal is in use, with resulting early failure; inadequate sealing contact of the sealing member with the surfaces that it seals together (in many constructions only line contact exists between the sealing member and a surface to which it is sealed); and tendencies for the sealing member to loosen after some use of the seal with leakage resulting. Further, many constructions are difficult to mount in place, and are expensive because of their complexity.

A general object of this invention is to provide a novel seal construction for sealing together two parts, that is relatively simple, but nevertheless is effective to maintain a superior sealing connection between the parts over long operating periods.

Another object is to provide a novel seal construction, characterized by a sealing member producing a sealing connection between two parts that engages the parts over expanses of relatively large area.

A further object is to provide a novel seal construction, where sealing engagement of a sealing member with a part that it is sealed to is produced, not so much by elongation and distortion in the sealing member, but instead by flexing of the member with a surface in the member being generated by the flexing that snugly fits against a complementary surface in said part.

Yet another object is to provide a seal construction that is readily mounted in operative position, and easily disassembled when it is desired to replace or repair elements therein.

A still further object is to provide a novel seal construction that is relatively compact, and that can be manufactured at low unit cost.

These and other objects and advantages are attained by the invention, and the same is described hereinbelow in conjunction with the accompanying drawings, wherein:

FIG. 1 illustrates a rotatable shaft mounted in a stationary housing, and shows portions of a seal construction between the shaft and housing constructed as contemplated in an embodiment of the invention;

FIG. 2 is a cross sectional view, taken generally along the line 2—2 in FIG. 1;

FIG. 3 illustrates a sealing member that is part of the seal construction, on a somewhat enlarged scale;

FIG. 4 is a view, on the same scale as FIG. 3, illustrating a ring or mounting member in the seal construction, with the sealing member shown in FIG. 3 mounted thereon and in a relaxed state and with portions of the sealing member and mounting member broken away; and FIG. 5 is a cross sectional view, on the same scale as FIGS. 3 and 4, taken along the line 5—5 in FIG. 2.

Referring now to the drawings, 10 indicates a stationary housing, and at 12 there is indicated a rotatable shaft extending through housing 10. Annular members or rings 14 and 16 encircle shaft 12, with these rings being relatively rotatable.

Ring 14 is connected to shaft 12 by suitable means (not shown) constructed so that the inside of the ring is sealed to the outside of the shaft. With the seal construction assembled as in FIG. 1, the mounting of ring 14 on shaft 12 is such that axial movement of the ring to the left on the shaft is inhibited. While ring 14 is sealed to shaft 12, and rotates with it, ring 16 is sealed to housing 10, and is stationary, together with the housing. Rings 14 and 16 have lapped faces 18 and 20 that slide against each other on rotation of shaft 12. As will hereinafter become apparent, the mounting of ring 16 is such that it is forced against ring 14 with face 20 pressing on face 18. Faces 18 and 20 are made with such smoothness that with ring 16 forced against ring 14, the faces seal themselves together to inhibit any leakage of fluid between the faces.

Considering now more fully the mounting of ring 16, an annular flange 26 projects in an axial direction from a central portion of the housing (to the left in the figures). Flange 26 is bounded on its inside by an annular wall 28. Wall 28 flares, progressing from the inner edge of the wall to the end of flange 26. In the embodiment illustrated, wall 28 has substantially a conical frustrum shape, although a small outer margin (indicated at 28a) may curve radially inwardly to provide a small lip at the outer margin of the wall. Joining with the inner edge of wall 28 is an annular, flat surface 30, that is disposed perpendicular to the axis of shaft 12. Surface 30 joins at its inner margin with a wall defining an annular groove 32 of rectangular cross section. The wall defining groove 32, annular wall 28, and surface 30 together define a recess in the housing which substantially completely receives ring 16, with wall 28 extending around and spaced radially out from ring 16.

Ring 16 (such also being referred to herein as a mounting member), fits loosely on shaft 12, which is to say that its inner diameter is somewhat greater than the outer diameter of the shaft. Around the outside of the ring and bounding a portion of it is an annular seating surface 36. Surface 36 flares progressing from the inner end of the ring (its right end in the figures) to its outer end. Thus, with the parts assembled it flares in the same direction as annular wall 28. Joining with the inner margin of seating surface 36 is a curved wall 38 defining an annular groove 40. At the outer margin of surface 36 is a wall 42 that forms the inner side of a radially projecting flange 44 provided in ring 16.

Seating surface 36 is spaced radially inwardly from annular wall 28, and in the space between them an annular, flexible sealing member 60 is provided. Member 60 engages wall 28 and seating surface 36 to inhibit leakage of fluid between the outside of the ring and the inside of the housing. Member 60 with the seal assembled exerts a thrust on ring 16 urging it to the left and snugly against ring 14. Further, it should be obvious that the member accommodates some play between ring 16 and housing 12.

The sealing member is shown separate from the other structure in FIG. 3. With reference to this figure, it will be seen that it comprises an annular body of flexible material that has an outer skirt or web portion 62, an inner skirt or web portion 64 joined to the larger diameter end of portion 62 and radially inwardly turned from outer skirt portion 62, and an annular bead portion 66 at the inner edge of skirt 64. Preferably the outer skirt portion and inner skirt portion have approximately uniform thicknesses, and the surfaces bounding the inner skirt portion curve smoothly to meet the surfaces bounding the outer skirt portion.

With reference to FIG. 4, the sealing member, when in a relaxed state and mounted on ring 16, positions itself with bead portion 66 seated in groove 40. Outer skirt portion 62 exends beyond the inner end of the ring member. Outer skirt portion 62 flares progressing from its smaller to its larger diameter end (which is to say that it tapers progressing in the opposite direction). With the sealing member in its relaxed state, the sealing member and ring 16 are readily mounted within the recess defined by wall 28 with substantially no flexing of the sealing member and with the smaller diameter end of the sealing member abutting surface 30. When so mounted, the outer, flaring surface of flaring skirt portion 62 engages over a relatively wide expanse flaring wall 28 of the housing.

When shaft 12 and ring 14 are properly mounted in place, with ring 14 against ring 16, and ring 16 thrust axially into the recess bounded by wall 28, the sealing member is flexed with the production of several results. A radial outward pressure of skirt portion 62 against wall 28 is produced, and thus the skirt portion is made snugly to fit against wall 28 over a wide expanse. A surface is generated in skirt portion 64 that complements flaring seating surface 36 in ring 16, and as a consequence on the inside of the sealing member a snug fit results over an expanse of relatively large area. Also, the sealing member exerts an axial force on ring 16 causing it to fit tightly against ring 14.

Summarizing some of the advantages of the construction, it is relatively easily put together with a tight seal resulting. Contact of the sealing member with surfaces on the inside and outside of the member is over a wide expanse. A good seal results even though during rotation of the shaft in the housing there may be some shifting in the position of ring 16 with respect to housing 10. The seal results primarily because of flexing in the sealing member, and not from stretching producing elongation in the member.

It should be obvious that the type of sealing member contemplated could be used in other types of seal constructions. For instance, the sealing member could be employed to seal shaft 12 to ring 14, or ring 16 to members different from housing 10.

I claim:
1. A sealing member for sealing one part to another part that encircles it, comprising an annular body of flexible material, said body including an annular flaring skirt portion having a small and a large diameter end adapted to engage in sealing relationship said other part, said body further including a radially inwardly turned annular web portion integral with said large diameter end of said skirt portion, said annular web portion including radially inner margins adapted to engage in sealing relationship said one part.

2. A sealing member for sealing one part to another part that encircles it, comprising an annular body of flexible material, said body including an annular flaring skirt portion having a small and large diameter end adapted to engage in sealing relationship said other part, said body further including a radially inwardly turned annular web portion integral with said large diameter end of said skirt portion, said web portion including at its radially inner edge an annular bead.

3. A sealing member for sealing one part to another part that encircles it, comprising an annular body of flexible material having an annular flaring outer skirt portion constructed to engage in sealing relationship said other part, integral with the larger diameter end of said outer skirt portion an annular inner skirt portion that is turned radially inwardly, and integral with the inner margin of said inner skirt portion a bead portion, said inner skirt portion having approximately uniform thickness and being bounded by inner and outer surfaces that curve smoothly into the inner and outer surfaces bounding said outer skirt portion.

4. A construction for sealing one part to another part comprising a mounting portion in said one part bounded around its outside by an annular flaring seating surface, a recess in said other part bounded by an annular wall that extends around and is spaced radially outwardly from said seating surface and that flares in the same direction as said seating surface, and an annular seating member of flexible material mounted in the space between said seating surface an annular wall, said sealing member having a skirt portion with an outer flaring surface substantially complementary to the flaring wall of said recess and fitted in sealing relationship against said wall, and integral with the larger diameter end of the skirt portion an annular web portion turned radially inwardly with inner margins of said web portion fitted in sealing relationship against said seating surface of said one part.

5. A construction for sealing one part to another part comprising a mounting portion in said one part bounded around its outside by an annular seating surface having approximately a conical frustrum shape, a recess in said other part bounded by an annular wall that extends around and is spaced radially outwardly from said seating surface, said annular wall having a conical frustrum shape and sloping in the same direction that said seating surface slopes, and an annular sealing member of flexible material mounted in the space between said seating surface and said annular wall, said sealing member having a skirt portion with an outer flaring surface shaped as a conical frustrum and substantially complementary to said wall and fitted in sealing relationship against said wall, and integral with the large diameter end of said skirt portion an annular web portion turned radially inwardly with inner margins thereof fitted in sealing relationship aagainst said seating surface of said one part.

6. A construction for sealing one part to another part comprising a mounting portion in said one part bounded around its outside by a wall portion defining a shallow annular groove and an annular flaring seating surface joining at the smaller diameter end thereof with said wall portion defining said groove, a flexible annular sealing member having an inner annular bead that with said sealing member in a relaxed state seats within said groove, said sealing member having joined to said bead one end of an annular web of material that progresses radially outwardly from said bead and terminates in a reversely turned skirt portion that tapers progressing toward the other end of the web of material, and a recess in said other part bounded by an annular wall that snugly receives said reversely turned tapered portion of said web of material.

7. In combination with a shaft and housing where the shaft and housing are relatively rotatable, an annular mounting member encircling and loosely mounted on said shaft, said member including a portion bounded around its outside by an annular flaring seating surface, a recess in said housing bounded by an annular wall that extends around and is spaced radially outwardly of said seating surface and that flares in the same direction as said seating surface, and an annular sealing member of flexible material mounted in the space between said seating surface and annular wall, said sealing member having a skirt portion with an outer flaring surface substantially complementary to the annular wall of said recess and fitted in sealing relationship against said wall, and integral with the larger end of said skirt portion an annular web portion turned radially inwardly with the inner margins of said web portion fitted in sealing relationship against said seating surface of said mounting member.

8. In combination with a shaft and housing where the shaft and housing are relatively rotatable, an annular mounting member encircling said shaft and loosely mounted thereon, said member including a portion bounded around its outside by a wall portion defining a shallow annular groove and an annular flaring seating surface joining at the smaller diameter end thereof with the wall portion defining said groove, a flexible annular sealing member having an inner annular bead that with the member in a relaxed state seats in said groove, said sealing member having joined to said bead one end of an annular web of material that progresses radially outwardly from said bead and terminates in a reversely turned skirt portion that tapers progressing toward the other end of the web of material, and a recess in said housing bounded by an annular wall that snugly receives said reversely turned tapered portion of said web of material.

References Cited in the file of this patent

UNITED STATES PATENTS

| 2,370,471 | Karlberg | Feb. 27, 1945 |
| 2,590,759 | Dale et al. | Mar. 25, 1952 |

FOREIGN PATENTS

| 836,002 | Great Britain | June 1, 1960 |
| 837,814 | Great Britain | June 15, 1960 |